June 1, 1926.                                         1,586,711
                         E. B. SHAND
RELAY SYSTEM FOR CONTROLLING INTERPOLE EXCITATION OF ROTARY CONVERTERS
                      Filed Oct. 16, 1922
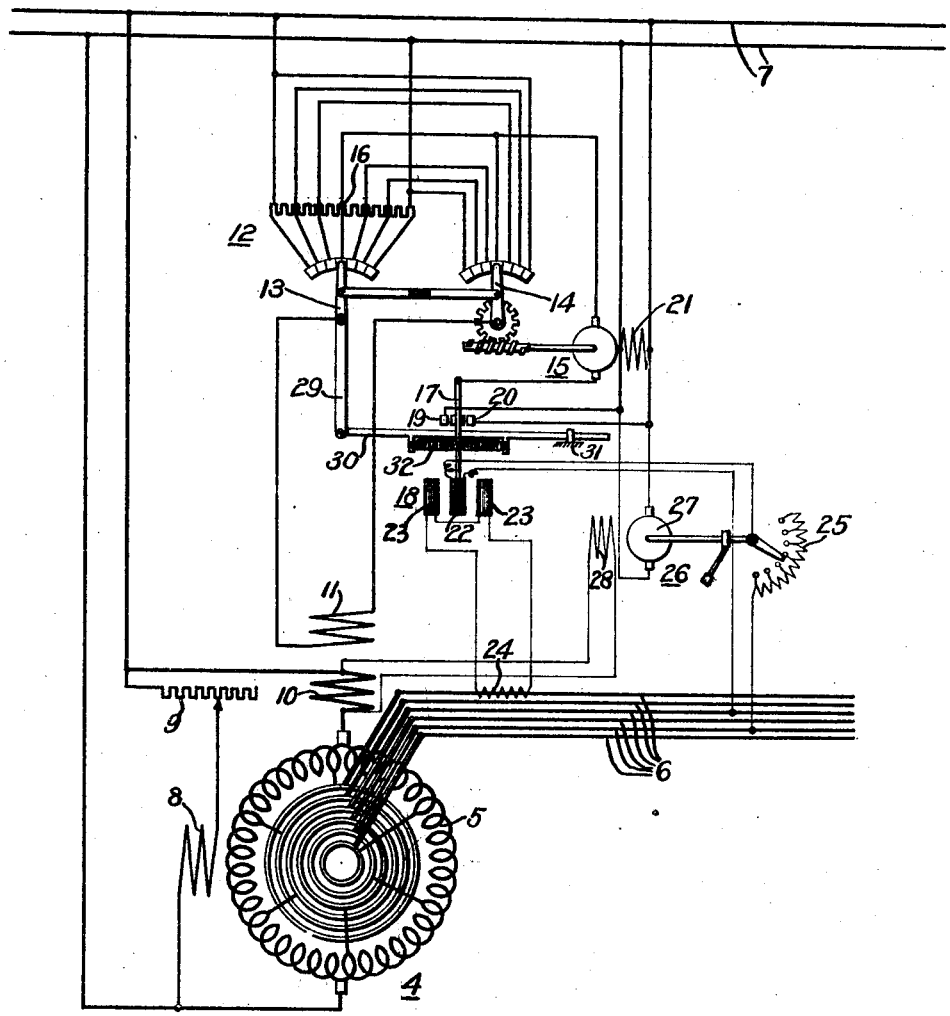
WITNESSES:                                    INVENTOR
                                           Errol B. Shand.
                                              BY
                                                ATTORNEY Patented June 1, 1926.

1,586,711

UNITED STATES PATENT OFFICE.

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA.

RELAY SYSTEM FOR CONTROLLING INTERPOLE EXCITATION OF ROTARY CONVERTERS.

Application filed October 16, 1922. Serial No. 594,735.

My invention relates to control systems and it has particular reference to such systems which are designed for controlling the interpolar field of a rotary converter.

The principal object of my invention is to provide an improvement in that type of control apparatus in which a controlling force is balanced against a force proportional to the controlled quantity, the last mentioned force being derived, according to my invention, by means of a spring carried by a movable support which is adjusted in position in accordance with the adjustment of the controlled apparatus.

A further object of my invention is to provide a system for controlling the excitation of an auxiliary commutating winding on a rotary converter utilizing a relay of the type just described.

With these and other objects in view, my invention consists in the methods and apparatus hereinafter disclosed and specifically recited in the appended claims.

The single figure of the accompanying drawing is a diagrammatic view of circuits and apparatus embodying my invention in what is believed to be a preferred form.

The present invention is an improvement upon that covered by my application, Serial No. 551,538, filed April 11, 1922, wherein is described a method of and means for adding a component of interpolar excitation to a rotary converter in accordance with the direction and the magnitude of the wattless current components drawn by the converter, the ratio of the added interpolar excitation to the wattless-current components being varied in accordance with the energy component of the load, in order to compensate for variations in the armature reaction resulting from changes in the angular position of the rotor under different load conditions.

In the drawing is shown a rotary converter 4, having an armature 5, which is connected to an alternating current line 6 and to a direct current line 7. The converter is also provided with three field windings, to-wit: an exciting winding 8 which is connected across the direct-current line through a rheostat 9, a series commutating field winding 10 and an auxiliary commutating field winding 11.

The auxiliary winding 11 is excited from a double-dial rheostat 12 having its terminals connected across the direct-current line 7 and having movable arms 13 and 14 connected to the respective terminals of said winding 11. The position of the movable arms 13 and 14 is controlled by means of a direct-current motor 15 having one brush terminal connected to the mid-point 16 of the rheostat 12 and having the other brush terminal connected to a switch arm 17 of a controlling element 18, said switch arm 17 being adapted to engage either the one or the other of two stationary contact members 19 and 20 which are connected, respectively, to the two conductors of the direct-current line 7. The motor 15 has a field winding 21 shown as being permanently connected across the direct-current main 7.

The switching device 18 may be a Siemens-dynamometer or a Kelvin-balance device, shown as comprising a movable coil 22 carried by the switch arm 17 and a pair of stationary coils 23 disposed on opposite sides thereof. The movable coil 22 is energized across two of the conductors of the alternating-current line 6 and it cooperates with the stationary coils 23 which are energized from a current transformer 24 in another of the conductors of the alternating-current line 6 in such manner that the coils 22 and 23 develop a torque proportional to the wattless component of the alternating current.

A variable resistor 25 is connected in series with the coil 22, or with the coils 23, and it is automatically controlled by means of any suitable current-responsive device, such as a so-called torque motor 26, which is a direct-current motor having an armature winding 27 energized across the direct-current line 6 and having a field winding 28 energized in any manner in accordance with the direct-current load. The field winding 28 is shown connected in shunt with the main series commutating winding 10 of the converter. The total torque of the relay 18 is thus a function of the product of the reactance component of alternating current and the direct-current output, the torque being increased as the load is increased.

When the relay device 18 is moved out of its neutral or zero position, the movable switch arm 17 is brought into contact with the one or the other of the stationary contact members 19 and 20, thereby energizing the motor 15 in the proper direction to make a compensating adjustment of the double-dial rheostat 12. As the movable arms 13 and 14 of the rheostat 12 are adjusted, in order to vary the current in the auxiliary commutating coil 11, a lever arm 29, extending from the movable arm 13, operates a sliding supporting member 30, which moves in a guideway 31 and supports a coil spring 32 or other resilient biasing device.

The center of the spring 32 is connected to the movable switch arm 17 of the controlling element 18, and thus the biasing torque, tending to return the switch arm to zero or neutral position, is increased in accordance with the adjustment of the double-dial rheostat 12. The values of the resistances between the successive segments of the double-dial rheostat are so chosen, with respect to the spring 32, that the movable arm 17 is always brought back to zero position at the instant that the current in the coil 11 reaches the proper value corresponding to the adjusting torque developed between the coils 22 and 23.

While I have described a specific form of embodiment of my invention, it will be obvious that many changes and substitutions of equivalents may be made by those skilled in the art without departing from the essential features of my invention. I do not desire, therefore, to be limited to the specific constructions shown, except in so far as may be required by the language of the appended claims when read in the light of the prior art.

I claim as my invention:

1. In combination with a controlling apparatus and a controlled circuit, an electric balance device comprising a movable contact arm and electro-dynamic means for producing a force tending to move said contact arm in either direction, in response to the condition of said controlling apparatus, a pair of contact-making elements on opposite sides of said contact arm, separate power means controlled by said contact-making elements for making a desired adjustment in the conditions obtaining in the controlled circuit, spring means having its central point connected to said movable contact arm for bringing back said contact arm to normal neutral position relative to said contact-making elements, and a mechanical connection driven by said separate power means for changing the relative positions of the central point of the spring means and the neutral axis between said contact-making elements, whereby said contact-arm is brought to neutral out-of-contact position whenever the movement of said separate power means has adjusted said controlled circuit an amount corresponding to the force produced by the electrodynamic means at any instant.

2. The combination with a rotary converter having a commutating field winding, of means for varying the field produced by said commutating field winding, and means for controlling said last-mentioned means comprising an element having coils energized by the alternating voltage and alternating current of said converter so as to be responsive to the wattless component of the alternating current, and an adjustable spring means mechanically connected to said field-varying means and to said controlling means.

3. The combination with a rotary converter having a commutating field winding, of means for varying the field produced by said commutating field winding, and means for controlling said last-mentioned means comprising an element having coils energized by the alternating voltage and alternating current of said converter so as to be responsive to the wattless component of the alternating current, means for, in effect, varying the impedance of the circuit of one of said coils, and an adjustable spring means mechanically connected to said field-varying means and to said controlling means.

4. In combination, alternating-current mains, direct-current mains, a rotary converter connected thereto and having a commutating field winding, a double-dial rheostat having arms and being connected across said direct-current mains, said commutating field winding being connected to said arms of said rheostat, regulating means for controlling said double-dial rheostat, a contact-making device for controlling said regulating means and having an element responsive to the wattless component of the alternating current taken by said rotary converter, and an adjustable spring means operating upon said contact-making device and mechanically connected to said regulating means.

5. In combination, alternating-current mains, direct-current mains, a rotary converter connected thereto and having a commutating field winding, a double-dial rheostat having arms and being connected across said direct-current mains, said commutating field winding being connected to said arms of said rheostat, regulating means for controlling said double-dial rheostat, a contact-making device for controlling said regulating means and having an element responsive to the wattless component of the alternating current taken by said rotary converter, means for varying the responsiveness of said element in accordance with the energy load current, and an adjustable spring means operating upon said contact-making device and mechanically connected to said regulating means.

6. A Siemens dynamometer, contacts thereon for controlling a motor upon departure in either direction from zero reading, and spring means operated by the movement of said motor for restoring the dynamometer to zero reading.

In testimony whereof, I have hereunto subscribed my name this 7th day of October, 1922.

ERROL B. SHAND.